US012761712B2

(12) United States Patent
Nam et al.

(10) Patent No.: US 12,761,712 B2
(45) Date of Patent: Oct. 13, 2026

(54) STORAGE DEVICE INCLUDING OUT-OF-BAND MANAGEMENT CONTROLLER AND SYSTEM AND OPERATION METHOD THEREOF

(71) Applicant: Samsung Electronics Co., Ltd., Suwon-si (KR)

(72) Inventors: Suckhyun Nam, Suwon-si (KR); Minha Kim, Suwon-si (KR); Ho-Jin Chun, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 55 days.

(21) Appl. No.: 18/676,882

(22) Filed: May 29, 2024

(65) Prior Publication Data

US 2025/0181132 A1 Jun. 5, 2025

(30) Foreign Application Priority Data

Dec. 4, 2023 (KR) ........................ 10-2023-0173430

(51) Int. Cl.
*G06F 11/00* (2006.01)
*G06F 1/28* (2006.01)
*G06F 11/07* (2006.01)
*G06F 13/40* (2006.01)
*G06F 13/42* (2006.01)

(52) U.S. Cl.
CPC ............ *G06F 1/28* (2013.01); *G06F 11/0754* (2013.01); *G06F 13/4081* (2013.01); *G06F 13/4282* (2013.01)

(58) Field of Classification Search
CPC ............. G06F 11/3058; G06F 11/0751; G06F 11/0754; G06F 11/079; G06F 1/28; G06F 1/30; G06F 3/0653
See application file for complete search history.

(56) References Cited

U.S. PATENT DOCUMENTS 5,748,972 A * 5/1998 Clark ........................ G06F 1/30 713/340
8,782,473 B2 7/2014 Stenfort
9,201,604 B2 12/2015 Cho
(Continued)

FOREIGN PATENT DOCUMENTS

CN 114791868 B 9/2022
JP 2021-106002 A 7/2021
(Continued)

*Primary Examiner* — Marc Duncan
(74) *Attorney, Agent, or Firm* — Harness, Dickey & Pierce, P.L.C.

(57) ABSTRACT

A method for operating a storage device according to some example embodiments may include monitoring a power supply voltage provided by an external host device; detecting an error of the power supply voltage; generating self-monitoring data of the power supply voltage, and requesting real-time state information to the external host device, based on detection of the error of the power supply voltage; receiving the real-time state information from the external host device; generating result data for indicating whether the error of the power supply voltage is caused by the storage device based on the self-monitoring data and the real-time state information; and transmitting the result data to the external host device.

20 Claims, 13 Drawing Sheets

(56) References Cited

U.S. PATENT DOCUMENTS

| | | | | |
|---|---|---|---|---|
| 9,830,993 | B2 | 11/2017 | Kong et al. | |
| 10,795,599 | B2 | 10/2020 | Du et al. | |
| 11,543,871 | B2 | 1/2023 | Lee et al. | |
| 11,644,994 | B2 | 5/2023 | Du et al. | |
| 2011/0258365 | A1 | 10/2011 | Cho | |
| 2013/0254597 | A1 | 9/2013 | Stenfort | |
| 2017/0206974 | A1 | 7/2017 | Kong et al. | |
| 2019/0278507 | A1 | 9/2019 | Du et al. | |
| 2020/0201762 | A1* | 6/2020 | Bang | G06F 12/0804 |
| 2020/0301495 | A1* | 9/2020 | Masubuchi | G11C 16/225 |
| 2020/0363977 | A1 | 11/2020 | Du et al. | |
| 2021/0124681 | A1 | 4/2021 | Wu et al. | |
| 2022/0129056 | A1 | 4/2022 | Lee et al. | |
| 2022/0155840 | A1* | 5/2022 | Adi | G06F 1/3275 |
| 2022/0206553 | A1* | 6/2022 | Zhao | G06F 1/305 |
| 2023/0096935 | A1 | 3/2023 | Lee et al. | |
| 2023/0350595 | A1 | 11/2023 | Du et al. | |

FOREIGN PATENT DOCUMENTS

| | | | |
|---|---|---|---|
| KR | 10-1316919 | B1 | 10/2013 |
| KR | 10-2019-0098688 | A | 8/2019 |
| KR | 10-2022-0053177 | A | 4/2022 |
| KR | 10-2528558 | B1 | 5/2023 |

* cited by examiner

1000

1300

STORAGE DEVICE INCLUDING OUT-OF-BAND MANAGEMENT CONTROLLER AND SYSTEM AND OPERATION METHOD THEREOF

CROSS-REFERENCE TO RELATED APPLICATION

This application claims priority to and the benefit of Korean Patent Application No. 10-2023-0173430 filed in the Korean Intellectual Property Office on Dec. 4, 2023, the entire contents of which are incorporated herein by reference.

BACKGROUND

The present disclosure relates to storage devices and systems and methods for operating the same.

A large capacity storage device such as a solid state drive (SSD) is mainly used by being connected to a host device, and read operations, write operations, etc. on the SSD are performed according to read requests, write requests, etc. from the host device.

Meanwhile, errors may occur in the storage device due to various reasons such as the problems of a power supply voltage provided by the host device, but there is a problem in that it may not respond to an operation failure of the storage device when it actually occurs.

In addition, when the operation failure of the storage device occurs, the storage device uses various data that are collected internally, and when the storage device uses the internally collected data, it is difficult to understand whether the cause of the operation failure of the storage device is the host device or is another environmental problem.

SUMMARY

The present disclosure provides storage devices and systems for preventing or reducing operational fail of the storage device by analyzing real-time state information on the storage device.

The present disclosure provides storage devices and systems for analyzing causes of problems of a storage device based on real-time state information of the storage device and real-time state information of a host device, and transmitting the same to the host device to provide a solution for or improvement in detecting points of the causes of the problems.

Some example embodiments of the present disclosure provide a method for operating a storage device including monitoring a power supply voltage provided by an external host device; detecting an error of the power supply voltage; generating self-monitoring data of the power supply voltage, based on detection of the error of the power supply voltage, and requesting real-time state information from the external host device; receiving the real-time state information from the external host device; generating result data for indicating whether the error of the power supply voltage is caused by the storage device based on the self-monitoring data and the real-time state information; and transmitting the result data to the external host device.

Some example embodiments of the present disclosure provide a storage system including a host device including a power managing module configured to provide a power supply voltage and a baseboard management controller (BMC) configured to collect state information of the power managing module; and a storage device including an out-of-band management controller (OMC) configured to detect an error of power supply voltages provided by a storage controller performing a data processing operation with the host device and the power managing module through a first-type bus, generate self-monitoring data indicating state information on the power supply voltage based on detection of the error of the power supply voltage, request real-time state information on the power supply voltage provided by the power managing module to the BMC through a second-type bus that is different from the first type, and comparing the self-monitoring data and the real-time state information and generating result data for indicating whether the error of the power supply voltage is caused by the host device in response to receiving the real-time state information from the BMC through the second-type bus.

Some example embodiments of the present disclosure provide a storage device including a storage controller configured to perform a data processing operation with an external host device through a first-type bus; and an OMC configured to monitor a power supply voltage received from the external host device, generate first log data for indicating state information on the power supply voltage received from the external host device based on detecting an error of the power supply voltage, request second log data indicating real-time state information on the power supply voltage from the external host device through a second-type bus that is different from the first type as a master device, and transmit result data generated by comparing the first log data and the second log data to the external host device in response to an error of the power supply voltage being caused by the external host device based on comparing the first log data and the second log data.

DETAILED DESCRIPTION OF THE EMBODIMENTS

Figure 1:
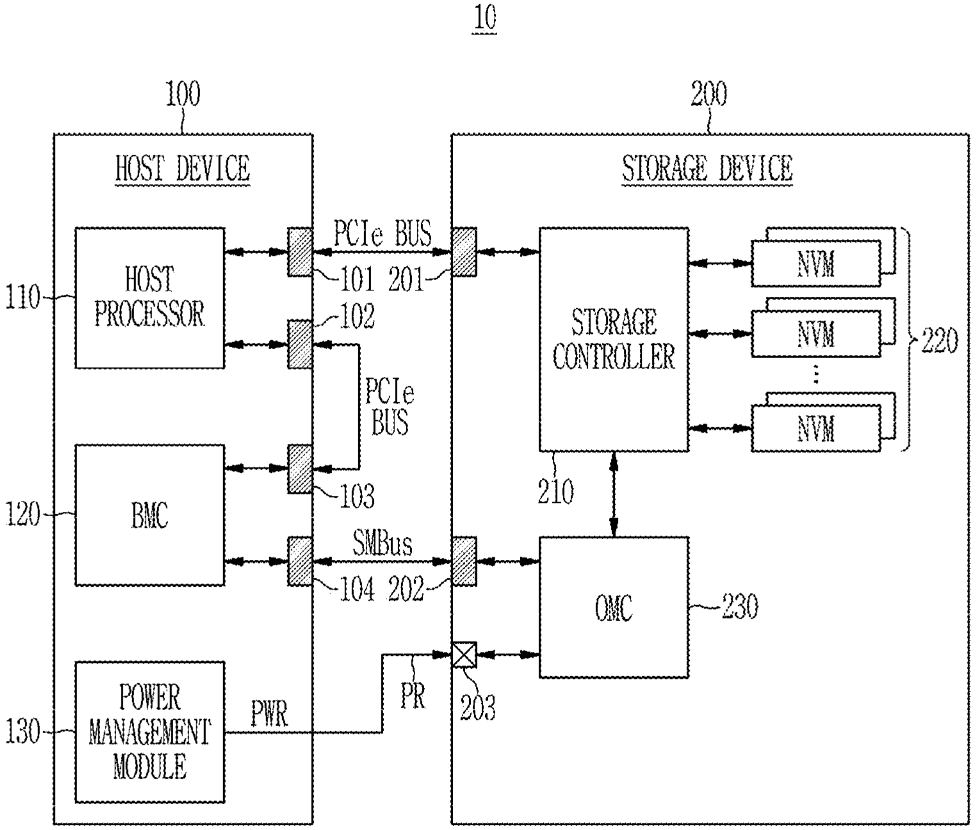
FIG. 1 shows a block diagram of a storage system according to some example embodiments.

In the following detailed description, only certain example embodiments of the present inventions have been shown and described, simply by way of illustration. As those skilled in the art would realize, the described example embodiments may be modified in various different ways, all without departing from the spirit or scope of the present inventions.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

An expression recited in the singular may be construed as singular or plural unless the expression "one", "single", etc., is used. Terms including ordinal numbers such as first, second, and the like, will be used only to describe various components, and are not to be interpreted as limiting these components. The terms may only be used to differentiate one component from others.

FIG. 1 shows a block diagram of a storage system according to some example embodiments.

The storage system 10 may include a host device 100 and a storage device 200. For example, the storage system 10 may be included in user devices such as a personal computer, a laptop computer, a server, a media player, or a digital camera, or automotive devices such as a GPS, a black box, or a vehicle electric device. Alternatively, the storage system 10 may be included in mobile systems such as a mobile phone, a smartphone, a tablet personal computer, a wearable device, a healthcare device, or an internet of things (IoT) device.

The host device 100 may include a host processor 110, a baseboard management controller (BMC) 120, a power managing module 130, PCIe ports 101, 102, and 103, and a system management bus (SMBus) port 104.

The host processor 110 may include an application layer such as a host operating system (OS), and a protocol layer such as a nonvolatile Memory Express (NVMe).

The host OS may be driven by the host processor 110 and may control a general operation of the host device 100. For example, the host OS may control data processing operations of the storage device 200, that is, a data read operation or a data write operation. The NVMe may be a register-level interface for regulating a method for host software driven by the host device 100 to communicate with the storage device 200 through a peripheral component interconnect express (PCIe) bus. The host processor 110 may be realized with a general-purpose processor including one or more processor cores, an exclusive processor, or an application processor.

The host processor 110 may transmit commands and addresses and may transmit/receive data to control data processing operations of the storage device 200. The host processor 110 may transmit commands, addresses, and data to the storage device 200 through the PCIe port 101, the PCIe bus, and the PCIe port 201, and may receive data from the storage device 200 through the PCIe port 201, the PCIe bus, and the PCIe port 101.

The BMC 120 may include an application layer such as a BMC OS, a protocol layer such as a NVMe management interface (NVMe-MI), and a transport layer such as a management component transport protocol (MCTP). The BMC OS may control a general operation of the BMC 120. The NVMe-MI may provide a management console for supporting an in-band management function of the storage system 10 operable based on the NVMe, an out-of-band management function, and various types of OSs. The MCTP may define a message transmitting protocol.

The BMC 120 is an embedded controller specialized in system management, and it may manage the host device 100. For example, the BMC 120 may monitor states of respective hardware in the system such as the host processor 110, the power managing module 130, and a field replaceable unit (FRU) and may store the monitored data. For example, the BMC 120 may collect state information of the host device 100, such as temperatures of respective components of/connected to the host device 100, and power supply voltages of the power managing module 130, and may record the same.

The BMC 120 may provide the monitored data to the host processor 110 through the PCIe port 103, the PCIe bus, and the PCIe port 102. The host processor 110 may provide the data received from the BMC 120 to the storage device 200 through the PCIe port 101, the PCIe bus, and the PCIe port 201.

The BMC 120 may receive a signal for requesting state information of the host device 100 from an out-of-band management controller (OMC) 230 of the storage device 200. For example, the OMC 230 may monitor state information of the storage device 200, and may detect errors or troubles generated in the storage device 200. The OMC 230 may, when detecting a trouble of the power supply voltage provided to the storage device 200, transmit a signal for requesting real-time state information of the power supply voltage provided by the host device 100 to the BMC 120. In another way, the OMC 230 may, when detecting a trouble of the power supply voltage provided to the storage device 200, transmit a signal for requesting information on the storage device connected to the host device 100 to the BMC 120. In this instance, the signal transmitted from the OMC 230 may be transmitted through the SMBus port 202, the SMBus, and the SMBus port 104. When the OMC 230 is operable as a master device, the BMC 120 may transmit real-time state information on the power supply voltage provided by the host device 100 or information on the storage device connected to the host device 100 based on the request of the OMC 230. The information provided by the BMC 120 of the host device 100 may be transmitted to the OMC 230 through the SMBus port 104, the SMBus, and the SMBus port 202.

The respective PCIe ports 102 and 103 may include a physical layer and/or and a logic layer for transmitting, receiving, and processing data, signals, and/or packets so that the host processor 110 may communicate with the BMC 120. The respective PCIe ports 101 and 201 may include identical/similar layers so that the host processor 110 may communicate with a storage controller 210, and the respective SMBuses 104 and 202 may include identical/similar layers so that the BMC 120 may communicate with the storage controller 210. For example, in this instance, the respective PCIe ports 101, 102, 103, and 201, and the respective SMBus ports 104 and 202 may include an NVMe management endpoint, and the NVMe management endpoint may be a MCTP endpoint.

The power managing module 130 may provide a power supply voltage (PWR) to the storage device 200. For example, the power managing module 130 may be realized with a power management integrated circuit (PMIC). The storage device 200 may receive the power supply voltage (PWR) from the power managing module 130 through a power rail (PR) and a power port 203. The power supply voltage (PWR) supplied to the storage device 200 may be provided to other components (for example, the storage controller 210 and the non-volatile memory device 220) through the internal power rail of the storage device 200

The storage device 200 may include the OMC 230, the storage controller 210, and the non-volatile memory device 220.

For example, the storage device 200 may be realized with a SSD, a smart SSD, an embedded multimedia card (eMMC), an embedded universal flash storage (UFS) memory device, a UFS memory card, a compact flash (CF), a secure digital (SD), a micro secure digital (Micro-SD), a mini secure digital (Mini-SD), an extreme digital (xD), a memory stick, or similar forms thereof.

The storage device 200 may include the OMC 230. The OMC 230 may represent a micro controller unit (MCU) to which an out-of-band interface structure is applicable. In some example embodiments, the OMC 230 may monitor state information of the storage device 200, and may detect errors or troubles of the storage device 200. For example, the OMC 230 may monitor the power supply voltage (PWR) provided to the storage device 200, and may detect the trouble of the power supply voltage (PWR). For example, the OMC 230 may detect a case when the power supply voltage (PWR) provided to the storage device 200 is voltage-dropped below a specific threshold value or a case when a peak of the power supply voltage (PWR) has a value that is equal to or greater/less than a threshold value as a trouble of the power supply voltage (PWR). A detailed description of the OMC 230 will be described later with reference to FIG. 2.

In the present specification, the SMBus port 104 of the host device 100 is described to be connected to the SMBus port 202 of the storage device 200 through the SMBus, to which they are not limited. For example, in some example embodiments, the storage device 200 of the host device 100 may be connected through an inter-integrated circuit (I2C) bus.

Figure 2:
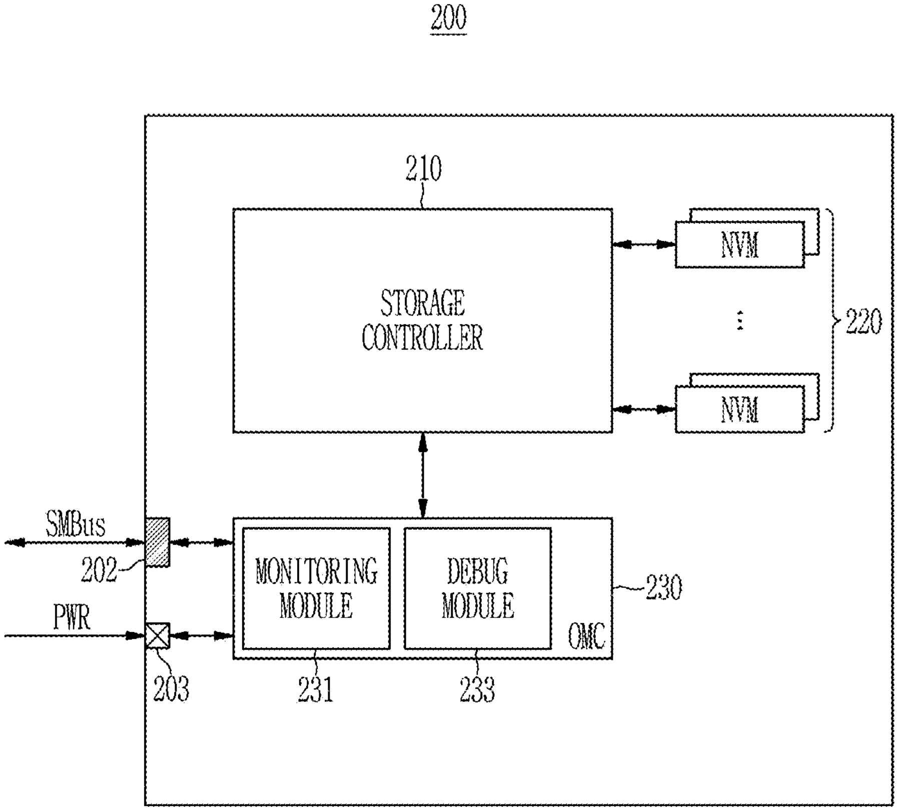
FIG. 2 shows a configuration of an OMC shown in FIG. 1.

FIG. 2 shows a configuration of an OMC shown in FIG. 1.

Referring to FIG. 2 together, the OMC 230 in the storage device 200 may include a monitoring module 231 and a debug module 233.

In some example embodiments, the monitoring module 213 of the OMC 230 may monitor the power supply voltage (PWR) provided to the storage device 200. The monitoring module 213 may monitor the power supply voltage (PWR) provided to the storage device 200 for a predetermined (or, alternatively, selected, or desired) period (for example, about or exactly 1 ms, or about or exactly 5 ms). Alternatively, the monitoring module 213 may include a comparator, and it may compare the power supply voltage (PWR) and a threshold value by use of the comparator and may monitor the power supply voltage (PWR) provided to the storage device 200.

In some example embodiments, the monitoring module 213 may collect state information at the time when the power supply voltage (PWR) provided to the storage device 200 has a trouble, and may generate self-monitoring data based on the collected information. The self-monitoring data may be log data on the power supply voltage (PWR) provided to the storage device 200. In detail, the self-monitoring data may include time information for indicating the time when the OMC 230 has detected that the power supply voltage (PWR) has a trouble, information (for example, an ID of storage device 200) for identifying the storage device 200, state information on the storage device 200, and/or voltage and current values of the storage device 200.

In some example embodiments, the monitoring module 213 may access the SMBus for connecting the SMBus ports 104 and 202, and may transmit a signal for requesting real-time state information of the power supply voltage provided from the power managing module 130 to the BMC 120 through the SMBus. The real-time state information of the power supply voltage received from the BMC 120 may be log data on the power supply voltage (PWR) collected by the BMC 120 when the OMC 230 transmits the signal.

In some example embodiments, the debug module 233 may compare self-monitoring data generated by the monitoring module 231 and real-time state information of the power supply voltage received from the BMC 120 and may generate a review result. The debug module 233 may perform a debugging for analyzing the causes of the troubles generated to the power supply voltage (PWR) provided to the storage device 200 based on the self-monitoring data and the real-time state information of the power supply voltage. As a result, the debug module 233 may check whether an error of the storage device 200 is caused by an error of the host device 100 through the debugging, and may prevent or reduce an operation or operational fail of the storage device 200. When transmitting the review result to the host device 100, the debug module 233 may provide a solution for the host device 100 to verify a power rail and detect an error generated point.

In some example embodiments, the host device 100 may receive a review result from the OMC 230. The host device 100 may verify the power rail analyzed as the cause of error or may detect the error generated point to prevent or reduce the operation or operational fail of the storage device 200. The host device 100 may, when an operation fail is generated to the storage device 200, further supply the power supply voltage to the power rail analyzed as the cause of error to solve the error of the storage device 200. To solve the error generated to the storage device 200, the host device 100 may analyze the log data generated by the storage device 200 when the error is generated and the log data generated by the host device 100 at the same time. For example, according to some example embodiments, there may be an increase in reliability, accuracy, and/or power efficiency of communication and operation of the device based on the above methods. Therefore, the improved devices and methods overcome the deficiencies of the conventional devices and methods of memory devices related to usage of multiple memory devices with a host having failures, while reducing resource consumption while improving data accuracy and power usage. Further, there is an improvement in detection and analysis of errors and operation fails by providing the methods and devices disclosed above.

Figure 3:
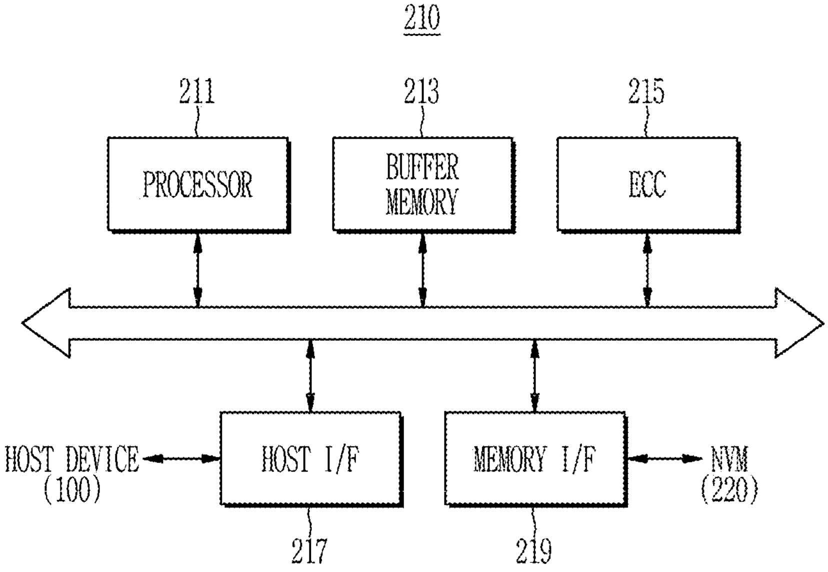
FIG. 3 shows a configuration of a storage controller shown in FIG. 1.

FIG. 3 shows a configuration of a storage controller shown in FIG. 1.

Referring to FIG. 3, the storage controller 210 may include at least one processor 211, a buffer memory 213, an error checking and correcting portion (ECC) 215, a host interface 217, and a memory interface 219.

The processor 211 may control a general operation of the storage controller 210. The processor 211 may drive various firmware/software for controlling the non-volatile memory 220. For example, the processor 211 may drive a flash transforming layer for managing a mapping table for defining a relationship between a logic address and a physical address of the non-volatile memory 220.

The buffer memory 213 may store instructions and data performed and processed by the storage controller 210. The buffer memory 213 may temporarily store the data stored/to be stored in the non-volatile memory 220. Signals buffered by the buffer memory 213 may be transmitted to the non-volatile memory 220 through the memory interface 219 and may be used. For example, the data (DATA) buffered by the buffer memory 213 may be programmed (stored, retained, etc.) to the non-volatile memory 220. In some example embodiments, the buffer memory 213 may store self-monitoring data generated by the OMC 230. In some example embodiments, the buffer memory 213 may store real-time state information of the power supply voltage received from the BMC 120 of the host device 100.

The ECC 215 may perform an error detecting and correcting function on read data that are read from the non-volatile memory 220. The ECC 215 may generate parity bits on write data to be written to the non-volatile memory 220, and the parity bits generated in this way may be stored in the non-volatile memory 220 together with the write data. When reading data from the non-volatile memory 220, the ECC 215 may correct the error of the read data by using the parity bits read from the non-volatile memory 220 together with the read data, and may output error-corrected read data.

The host interface 217 may communicate with the host device by using the bus having various communication rules. For example, the bus format may be based on at least one of the various interface rules such as the peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), USB, small computer system interface (SCSI), or NVMe management interface (NVMe-MI).

In some example embodiments, although the host interface 217 is shown to be an element of the storage controller 210, the host interface 217 may be understood to include at least some of the functions of the PCIe port 201 of FIG. 1 and/or the SMBus port 202 of FIG. 1.

The memory interface 219 may provide transmission/receiving of signals to/from the non-volatile memory 220. The memory interface 219 may transmit commands and control signals together with the data to be written to the non-volatile memory 220 to the non-volatile memory 220, or may receive the read data from the non-volatile memory 220.

Figure 4:
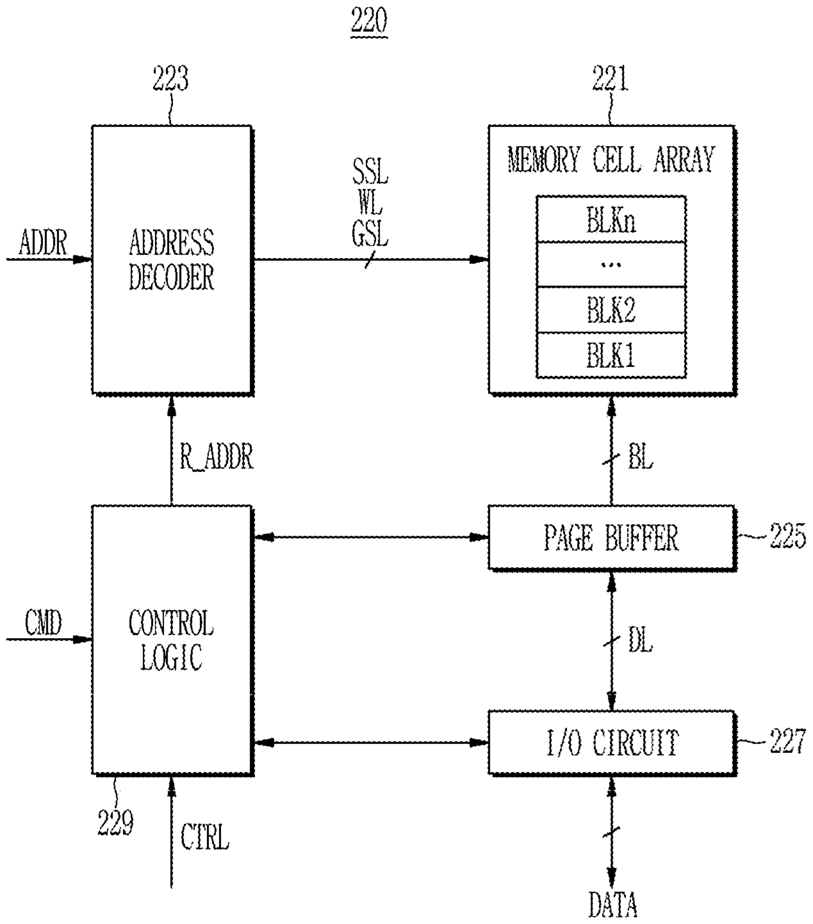
FIG. 4 shows a configuration of a non-volatile memory shown in FIG. 1.

FIG. 4 shows a configuration of a non-volatile memory shown in FIG. 1.

Referring to FIG. 4, the non-volatile memory 220 may include a memory cell array 221, an address decoder 223, a page buffer 225, an input/output circuit 227, and a control logic 229.

The memory cell array 221 may include memory blocks. The memory blocks may respectively include cell strings. The cell strings may respectively include memory cells. The memory cells may be connected to word lines WL. The memory cells may respectively include a single level cell SLC for storing one bit or a multi-level cell MLC for storing at least two bits.

Some of the memory blocks of the memory cell array 221 may store general user data, and the other thereof may store data (for example, log or retain) relating to errors of the storage device 200 and/or the host device 100.

The address decoder 223 may be connected to the memory cell array 221 through word lines WL, string selecting lines SSL, and ground selecting lines GSL. The address decoder 223 may receive an address ADDR from an outside, may decode the received logic address, and may drive the word lines WL. For example, the address ADDR may represent a physical address of the nonvolatile memory device 220 of which the logic address is transformed. The above-described address transforming operation may be performed by the flash transforming layer (FTL) driven by the storage controller 210 of FIG. 2.

The page buffer 225 may be connected to the memory cell array 221 through the bit lines BL. The page buffer 225 may control the bit lines BL so that the data (DATA) received from the input/output circuit 227 may be stored in the memory cell array 221 according to control by the control logic circuit 229. The page buffer 225 may read the data stored in the memory cell array 221 and may transmit the read data to the input/output circuit 227 according to control by the control logic circuit 229. For example, the page buffer 225 may receive data from the input/output circuit 227 per page or may read data from the memory cell array 221 per page.

The input/output circuit 227 may receive data (DATA) from an external device, and may transmit the received data (DATA) to the page buffer 225.

The control logic circuit 229 may receive a command CMD and a control signal CTRL from an outside, and may control the address decoder 223, the page buffer 225, and the input/output circuit 227 in response to the received signals. For example, the control logic circuit 229 may control other components so that the data (DATA) may be stored in the memory cell array 221 in response to the signals CMD and CTRL. In another way, the control logic circuit 229 may control other components so that the data (DATA) stored in the memory cell array 221 may be transmitted to an external device in response to the signals CMD and CTRL. The control signal CTRL may be a signal for the storage controller 210 to control the non-volatile memory 220.

The control logic circuit 229 may generate various voltages used in operating the non-volatile memory 220. For example, the control logic circuit 229 may generate various types of voltages including program voltages, pass voltages, select and read voltages, not-select and read voltages, erase voltages, and verify voltages. The control logic circuit 229 may provide the generated various types of voltages to the address decoder 223 or to a substrate of the memory cell array 221.

Figure 5:
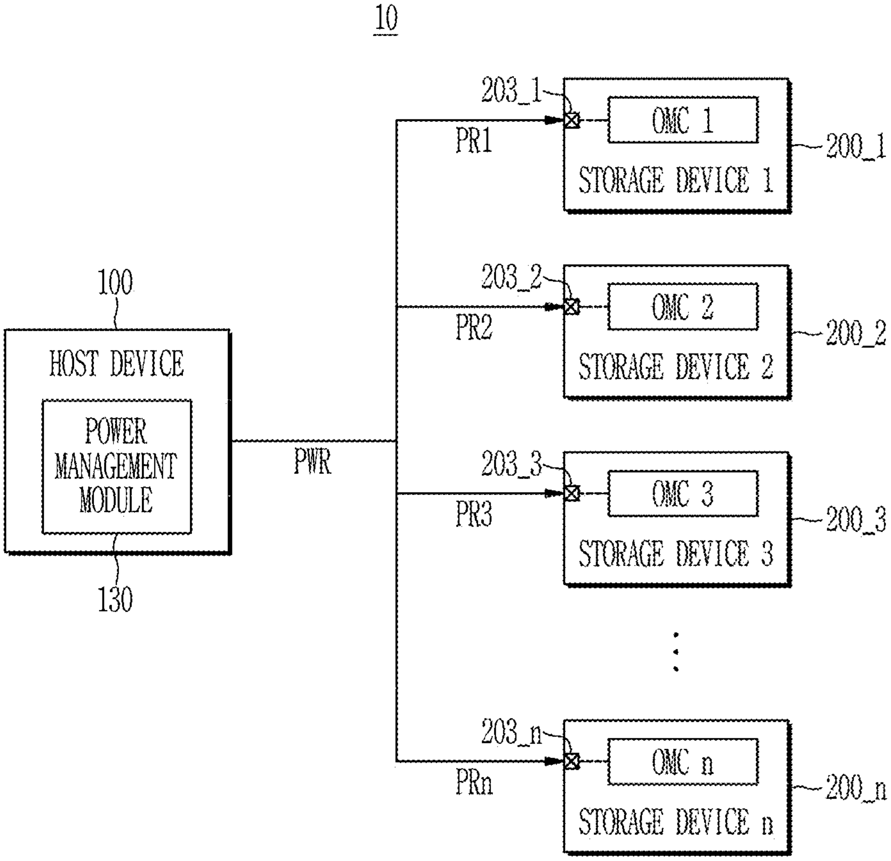
FIG. 5 shows a block diagram of a storage system according to some example embodiments.

FIG. 5 shows a block diagram of a storage system according to some example embodiments.

The storage system 10 may include a host device 100 and storage devices 200_1, . . . , 200_*n*. The power managing module 130 of the host device 100 may provide the power supply voltage (PWR) to the storage devices 200_1, . . . , 200_*n*.

The storage devices 200_1, . . . , 200_*n* may receive the power supply voltage (PWR) through power rails PR1, . . . , PRn and power ports 203_1, . . . , 203_*n* connected to the respective storage devices.

The respective storage devices 200_1, . . . , 200_*n* may include OMCs OMC 1, . . . , OMC n. The OMCs OMC 1, . . . , OMC n may monitor state information of the storage devices 200_1, . . . , 200_*n*, and may detect troubles of the storage devices 200_1, . . . , 200_*n*. For example, when the power supply voltage PWR supplied to the storage devices 200_1, . . . , 200_*n* is unstable, the OMC may detect this and may request real-time state information of the power supply voltage from the host device 100.

The troubles that may be generated in relation to the power supply voltage (PWR) provided to the storage devices 200_1, . . . , 200_*n* will be described later with reference to FIG. 6 and FIG. 7.

Figure 6:
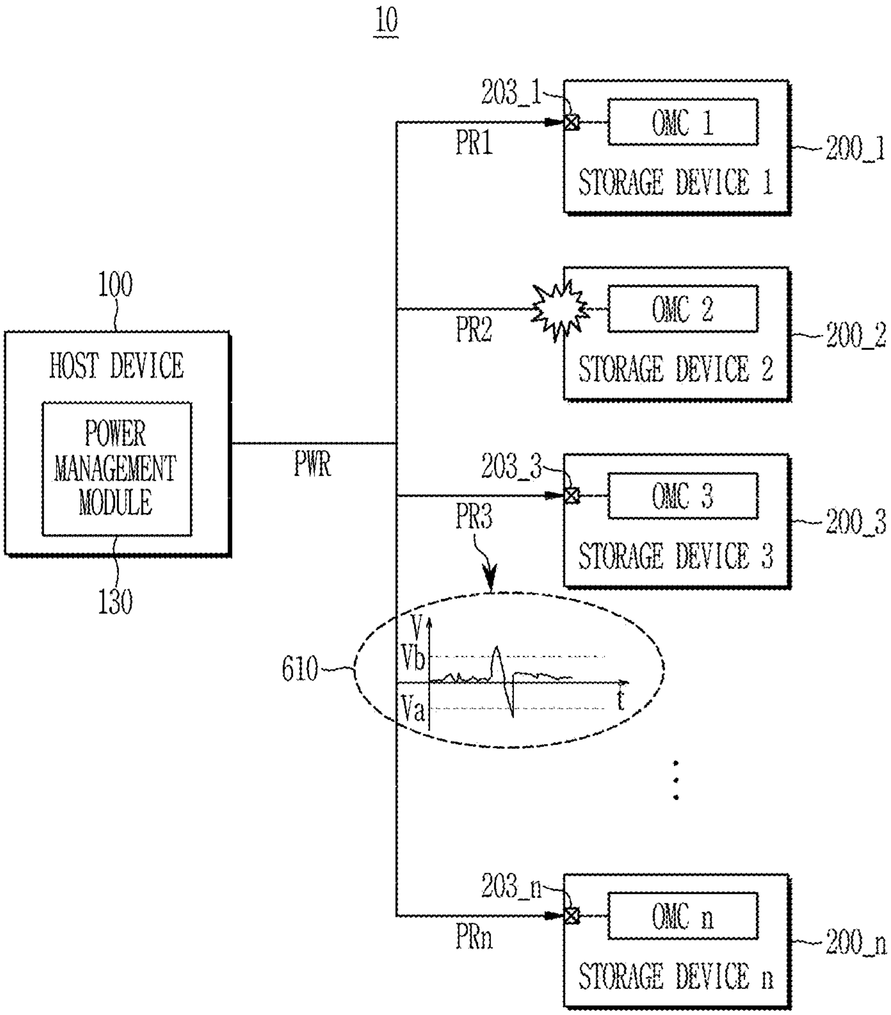
FIG. 6 shows problems that may be generated to a power supply voltage provided to a storage device according to some example embodiments.
Figure 7:
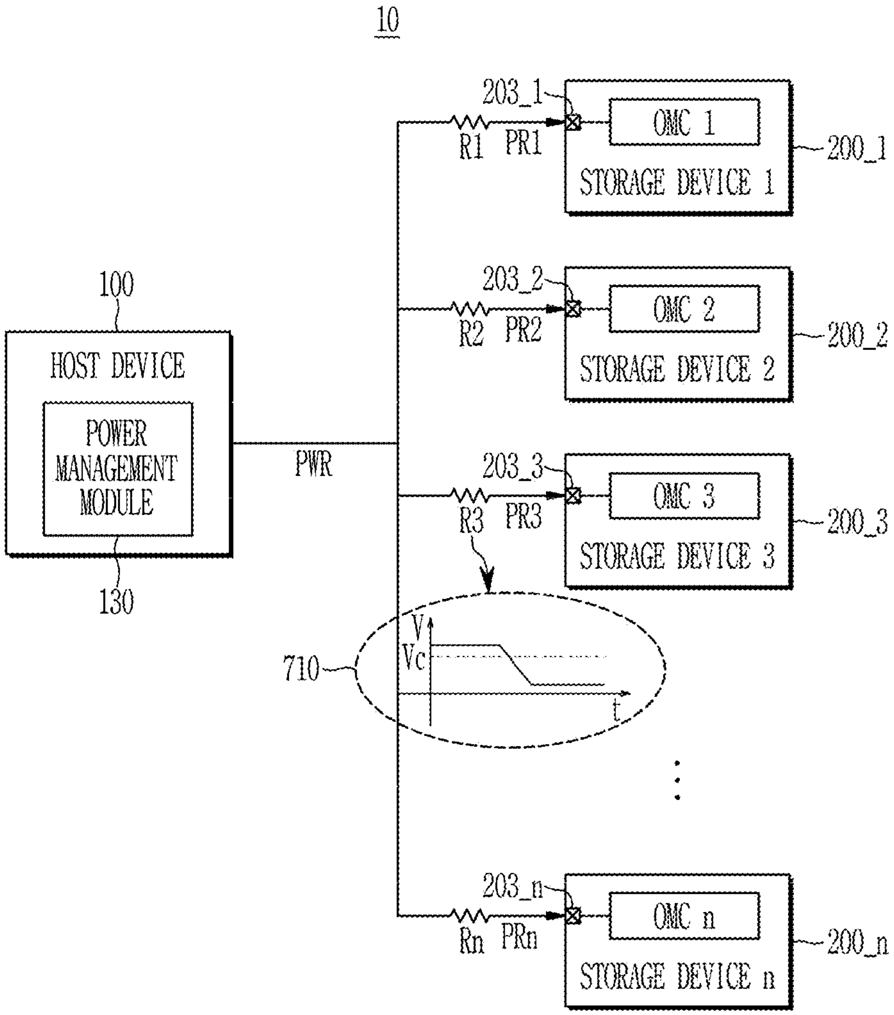
FIG. 7 shows problems that may be generated to a power supply voltage provided to a storage device according to some example embodiments.

FIG. 6 and FIG. 7 show problems that may be generated to a power supply voltage provided to a storage device according to some example embodiments.

Referring to FIG. 6, the storage devices 200_1, . . . , **200_*n* in the storage system 10 may receive the power supply voltage (PWR) from the power managing module 130 of the host device 100. In this instance, a hot plug operation on a predetermined (or, alternatively, selected, or desired) storage device may be performed. For example, the hot plug operation on the second storage device 200_2 may be performed. The hot plug operation on the second storage device 200_2 may instantly increase or reduce the power supply voltage provided to the second power rail PR2, thereby generating noise to the power supply voltage (PWR) provided to the other storage device that is adjacently connected. That is, the hot plug operation on the second storage device 200_2 may generate noise such as voltage glitch to the power supply voltage (PWR) through the power rail PR3 connected to the third storage device 200_3. The OMC (OMC 3) in the third storage device 200_3 may detect that the peak of the power supply voltage (PWR) provided through the power port 203_3 has a value that is equal to or greater than a threshold value (Vb) and/or is equal to or less than a threshold value (Va) (610). When detecting an error of the power supply voltage (PWR), the OMC (OMC 3) in the third storage device 200_3 may collect state information of the storage device 200_3** at the corresponding time, and may generate self-monitoring data based on the collected information.

Referring to FIG. 7, the storage devices 200_1, . . . , **200_*n* in the storage system 10 may receive the power supply voltage (PWR) from the power managing module 130 of the host device 100. The respective storage devices 200_1, . . . , 200_*n* may receive the power supply voltage (PWR) from the power managing module 130 in the host device 100 through the power rails PR1, . . . , PRn and the power ports 203_1, . . . , 203_*n* connected to the storage devices 200_1, . . . , 200_*n*. In this instance, resistance R1, . . . , Rn of the respective power rails PR1, . . . , PRn may generate a voltage drop of the power supply voltage (PWR) provided to the power rails PR1, . . . , PRn. For example, when the resistance R3 of the power rail PR3 connected to the third storage device 200_3 increases because of many reasons, a voltage drop of the power supply voltage (PWR) provided to the corresponding power rail PR3 is generated, and the third storage device 200_3 may receive the power supply voltage (PWR) that is equal to or less than a threshold value. The OMC (OMC 3) in the third storage device 200_3 may detect that the power supply voltage (PWR) provided through the power port 203_3 is equal to or less than a threshold value (Vc) (710). When detecting an error of the power supply voltage (PWR), the OMC (OMC 3) in the third storage device 200_3 may collect state information of the storage device 200_3** at the corresponding time, and may generate self-monitoring data based on the collected information.

Figure 8:
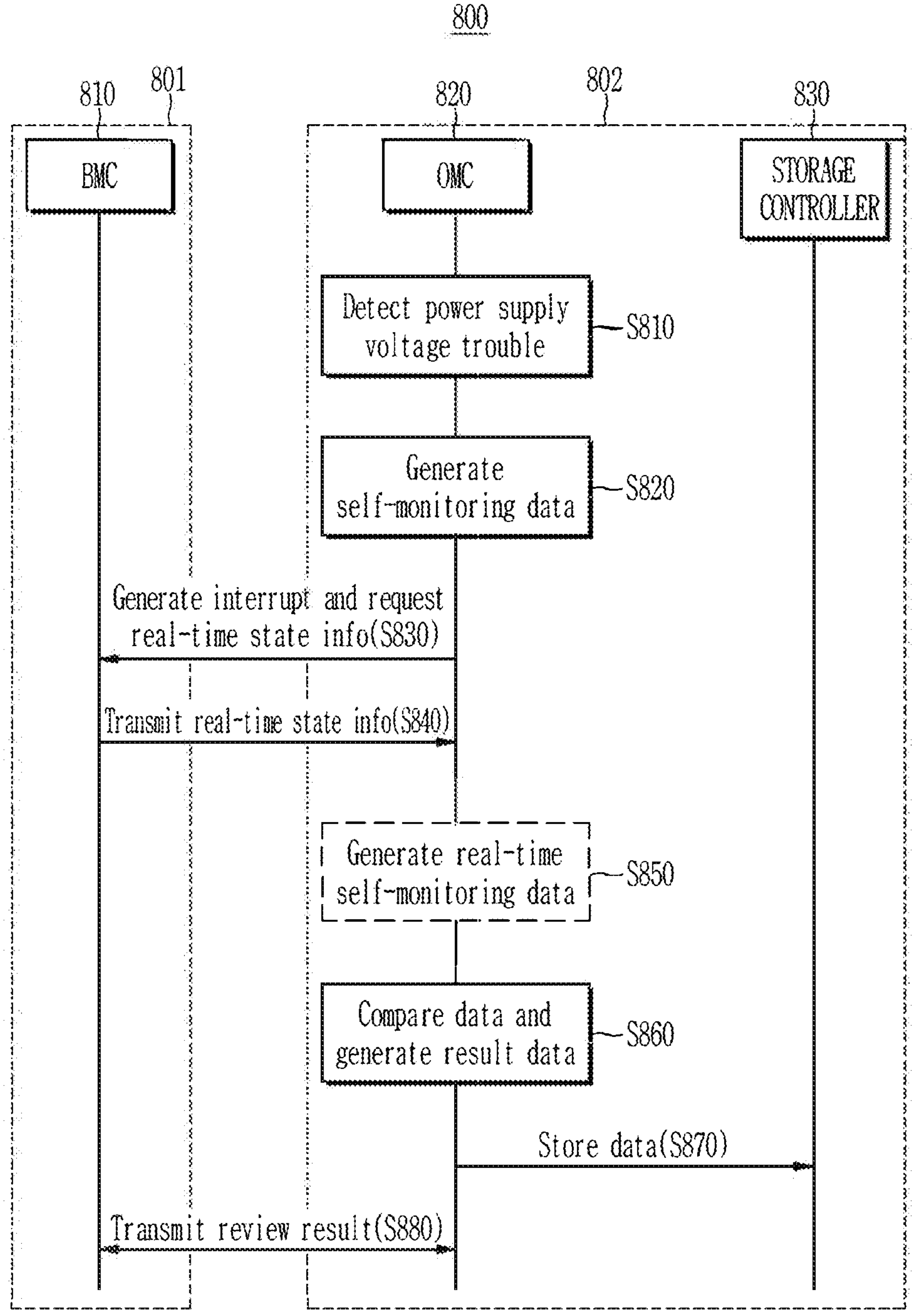
FIG. 8 shows a flowchart on a method for operating a storage system according to some example embodiments.

FIG. 8 shows a flowchart on a method for operating a storage system according to some example embodiments.

Regarding the method 800 for operating a storage system according to some example embodiments, the OMC 820 in the storage device 802 may detect a trouble of the power supply voltage (PWR) provided to the storage device 802 (S810). The OMC 820 may detect it when a voltage drop is generated to lower the power supply voltage (PWR) provided to the storage device 802 to be less than a threshold value, or when the peak value of the power supply voltage (PWR) provided to the storage device 802 has a value that is equal to or greater/less than a threshold value. The OMC 820 may detect the trouble of the power supply voltage (PWR) periodically or by using a comparator in the OMC 820.

In some example embodiments, when detecting the trouble of the power supply voltage (PWR) supplied to the storage device 802, the OMC 820 may generate self-monitoring data (S820). The self-monitoring data are log data on the power supply voltage (PWR) of the storage device 802, and may include time information indicating the time when the OMC 820 detects the trouble of the power supply voltage (PWR) of the storage device 802, information for identifying the storage device, and/or power supply voltages and current values supplied to the storage device.

In some example embodiments, the OMC 820 may generate an interrupt to the BMC 810 in the host device 801, and may request real-time state information of the power supply voltage from the host device 801 (S830). In detail, when the OMC 820 is operated as a master device, the OMC 820 may request real-time state information of the power supply voltage from the host device 801 through the SMBus. The real-time state information of the power supply voltage requested by the OMC 820 may be real-time state information of the power supply voltage provided to the storage devices connected to the host device 801, and/or real-time state information of the power supply voltage provided to a specific storage device.

In some example embodiments, when the BMC 810 is operated as the master device, the request of the OMC 820 may be ignored, and the OMC 820 may repeatedly request the real-time state information of the power supply voltage for a predetermined (or, alternatively, selected, or desired) period (for example, about or exactly 10 ms or about or exactly 20 ms). In some example embodiments, when the BMC 810 is operated as a slave device, the BMC 810 may transmit the real-time state information of the power supply voltage based on the request of the OMC 820 (S840). The real-time state information of the power supply voltage transmitted by the BMC 810 may include the power supply voltage and current information provided to the storage devices and/or a specific storage device by the host device 801 when the OMC 820 makes the request. The BMC 810 may transmit the real-time state information of the power supply voltage through the SMBus.

In some example embodiments, when receiving the real-time state information of the power supply voltage from the BMC 810, the OMC 820 may further generate real-time self-monitoring data (S850). The real-time self-monitoring data are power supply voltage data at a different time from the time when the OMC 820 detects the voltage trouble of the storage device 802, which allows to further accurately analyze the cause of the error generated to the power supply voltage of the storage device 802.

In some example embodiments, when receiving real-time power supply voltage state information from the BMC 810, the OMC 820 may compare self-monitoring data and the real-time power supply voltage state information and may generate result data (S860). In detail, the OMC 820 may perform a debugging for analyzing the cause of the error of the power supply voltage on the storage device 802 based on the real-time state information of the power supply voltage received from the BMC 810. For example, the OMC 820 may determine whether the error of the power supply voltage on the storage device 802 is caused or influenced from the host device 801, is caused or influenced by the power rail or the power port connected to the storage device 802, and/or is caused or influenced by another adjacent storage device, and may generate result data. The result data may be log data generated based on the self-monitoring data and the real-time power supply voltage state information. In another way, the OMC 820 may further consider the real-time self-monitoring data when comparing the self-monitoring data and the real-time power supply voltage state information and generating result data.

In some example embodiments, the OMC 820 may store the data in a memory of the storage controller 830 (S870). The data stored in the memory by the OMC 820 may include self-monitoring data, real-time power supply voltage information, and result data. The OMC 820 may store the self-monitoring data and the real-time state information of the power supply voltage received from the BMC 810. By this, when the trouble is generated to the host device 801, the OMC 820 may more quickly and accurately analyze the cause of the trouble. In some example embodiments, the host device and/or the storage device may correct an operational voltage, disable a faulty connection, or take another appropriate action, etc. based on the determined cause of power supply voltage trouble.

In some example embodiments, the OMC 820 may transmit review result data to the BMC 810 (S880).

Figure 9:
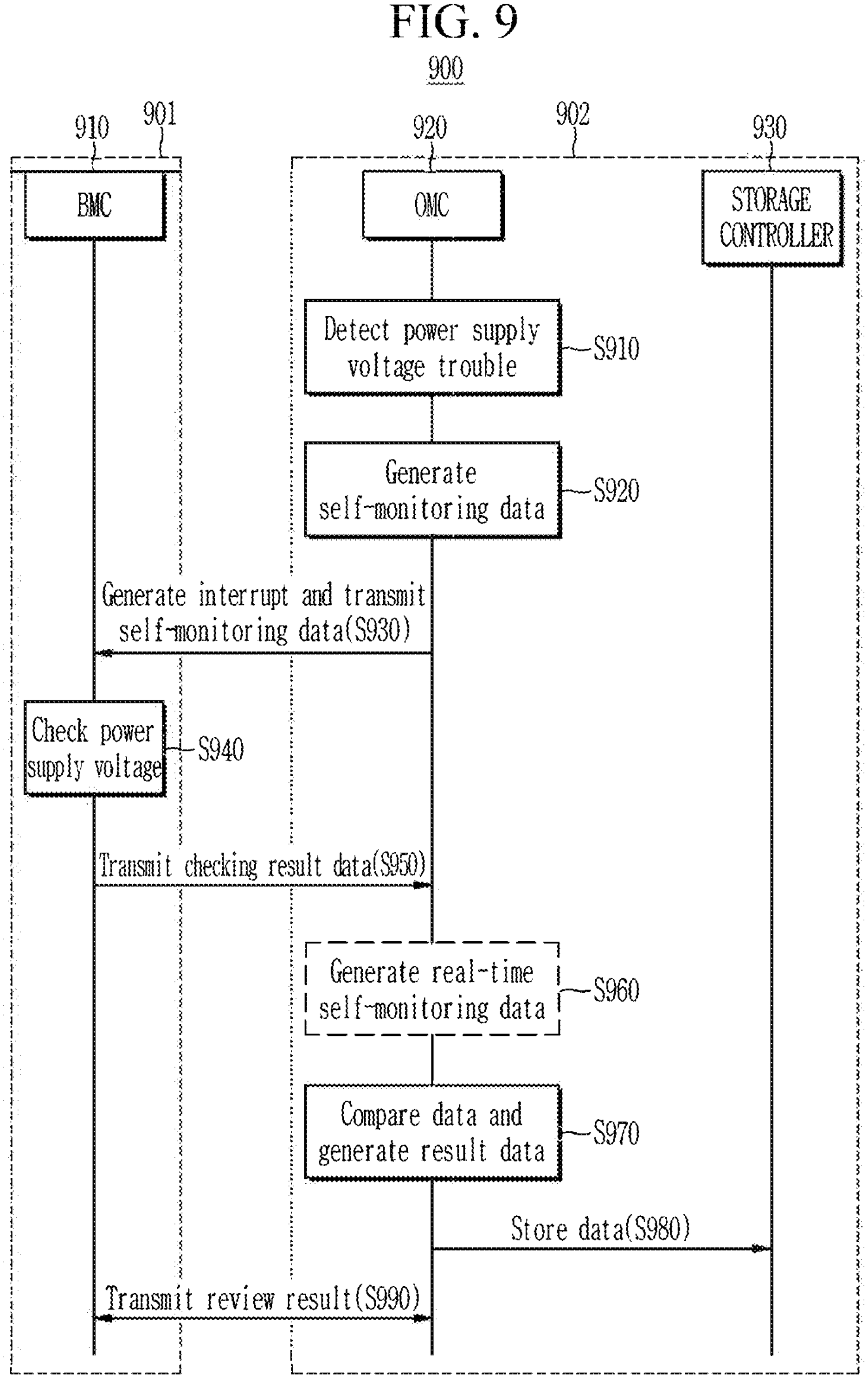
FIG. 9 shows a flowchart on a method for operating a storage system according to some example embodiments.

FIG. 9 shows a flowchart on a method for operating a storage system according to some example embodiments. Regarding the operation method 900 of FIG. 9, the identical or similar operation to the operation method described with reference to FIG. 8 will not be described.

In some example embodiments, the OMC 920 in the storage device 902 may detect the trouble of the power supply voltage (PWR) supplied to the storage device 902 (S910).

In some example embodiments, when detecting the trouble of the power supply voltage (PWR) supplied to the storage device 902, the OMC 920 may generate self-monitoring data (S920).

In some example embodiments, the OMC 820 may generate an interrupt to the BMC 810 in the host device 801, and may transmit the self-monitoring data (S930). The OMC 820 may transmit the self-monitoring data to the host device 901 through the SMBus.

In some example embodiments, the BMC 910 may check the power supply voltage (PWR) provided by the host device 901 and the storage devices connected to the host device 901 based on the self-monitoring data (S940). For example, with reference to the time of receiving the self-monitoring data, the BMC 910 may perform a checking operation for determining whether there is a storage device or a power port that is/is not recently recognized.

In some example embodiments, the BMC 910 may transmit checking result data (S950). The checking result data may be log data on which the power supply voltage checked by the BMC 910 and state information of the storage device are recorded. The checking result data may be transmitted to the storage device 902 through the SMBus.

In some example embodiments, when receiving the checking result data from the BMC 910, the OMC 920 may further generate real-time self-monitoring data (S960).

In some example embodiments, when receiving the checking result data from the BMC 910, the OMC 920 may compare the checking result data and the real-time power supply voltage state information and may generate result data (S970).

In some example embodiments, the OMC 920 may store data in the memory of the storage controller 930 (S980).

In some example embodiments, the OMC 920 may transmit the result data to the BMC 910 (S990).

Figure 10:
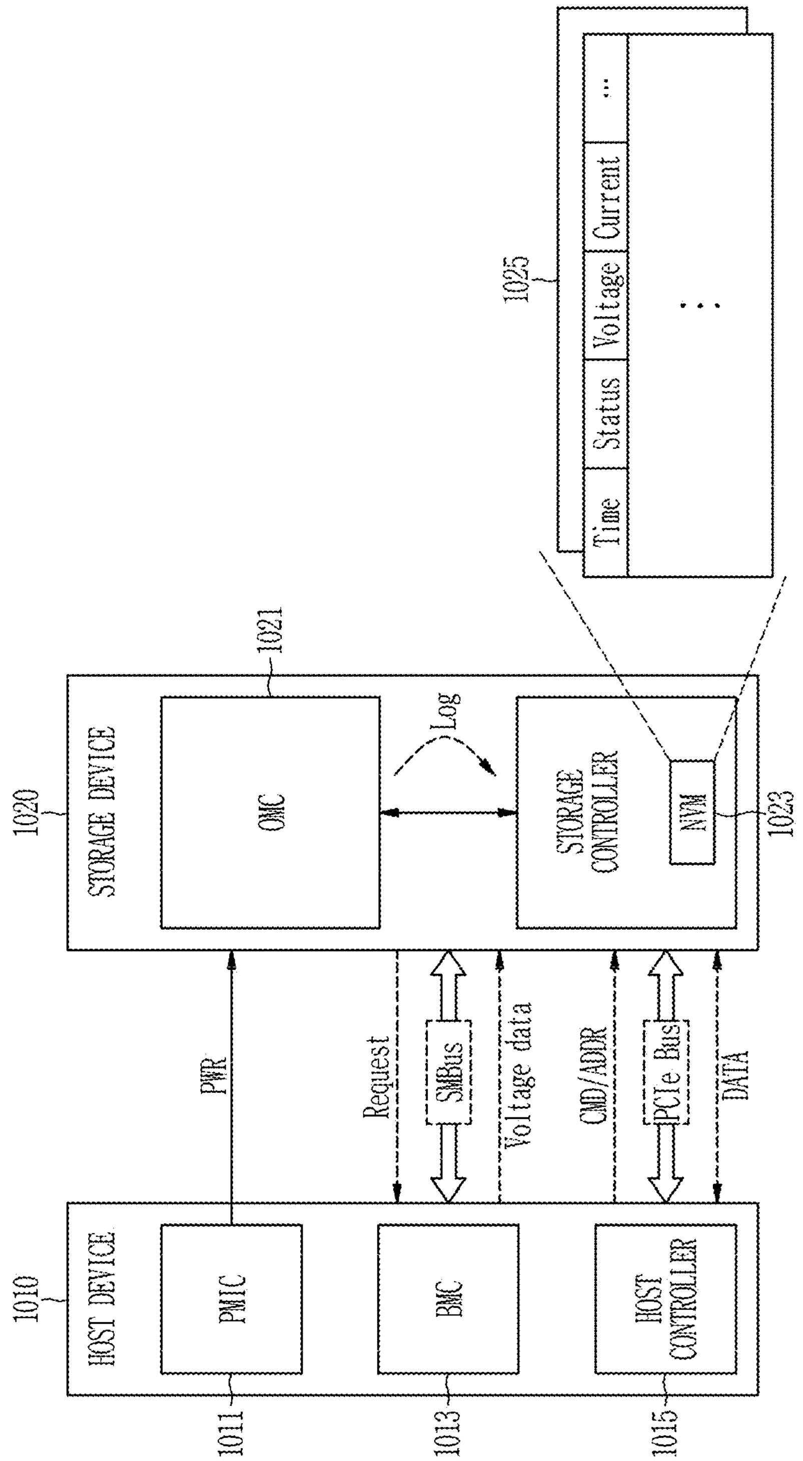
FIG. 10 shows a block diagram on an operation of a storage system according to some example embodiments.

FIG. 10 shows a block diagram on an operation of a storage system according to some example embodiments.

The host device 1010 in the storage system 1000 may transmit a command CMD and an address ADDR to the storage device 1020 and may transmit/receive the data DATA to read or write the data. The command CMD, the address ADDR, and the data DATA for the host device 1010 to control a data processing operation of the storage device 1020 may be transmitted through the PCIe bus.

The storage device 1020 may receive the power supply voltage (PWR) from the PMIC 1011 disposed in the host device 1010 (or connected to the host device 1010) through the power rail and the power port.

The OMC 1021 of the storage device 1020 may monitor the power supply voltage (PWR) of the storage device 1020, and may detect the trouble of the power supply voltage (PWR). When detecting the trouble of the power supply voltage (PWR) of the storage device 1020, the OMC 1021 may transmit a signal (Request) for requesting real-time state information of the power supply voltage to the host device 1010. The BMC 1013 of the host device 1010 may transmit real-time state information (Voltage data) of the power supply voltage based on the request of the OMC 1021. The request (Request) of the OMC 1021 and the data (Voltage data) of the BMC may be transmitted through the SMBus having a different type from the PCIe bus.

The OMC 1021 may store the self-monitoring data of the power supply voltage trouble and the real-time state information 1025 of the power supply voltage received from the host device in the memory 1023 of the storage device. The OMC may compare the self-monitoring data and the real-time state information of the power supply voltage and may generate result data to thus debug the power supply voltage trouble.

In general, the storage device may fail to react to the error of the power supply voltage provided by the host device until the storage device generates an operation fail, and it is difficult to determine whether the cause of the corresponding trouble is the host device or anything else after the storage device has generated the operation fail. However, according to the present disclosure, the storage device generates log data when finding the trouble of the power supply voltage, receives the real-time state information of the power supply voltage from the host device, compares them, and analyzes them to determine the cause of the power supply voltage trouble generated to the storage device may be easily found, and the operation fail of the storage device may be prevented or a chance thereof is reduced as merits. As such, according to some example embodiments, there may be an increase in reliability, accuracy, and/or power efficiency of communication and operation of the device based on the above methods. For example, there is an improvement in detection and analysis of errors and operation fails by providing the methods and devices disclosed above. In some example embodiments, the storage device and/or host corrects an operational voltage, disables a faulty connection, or takes another appropriate action, etc. based on the determined cause of power supply voltage trouble.

Figure 11:
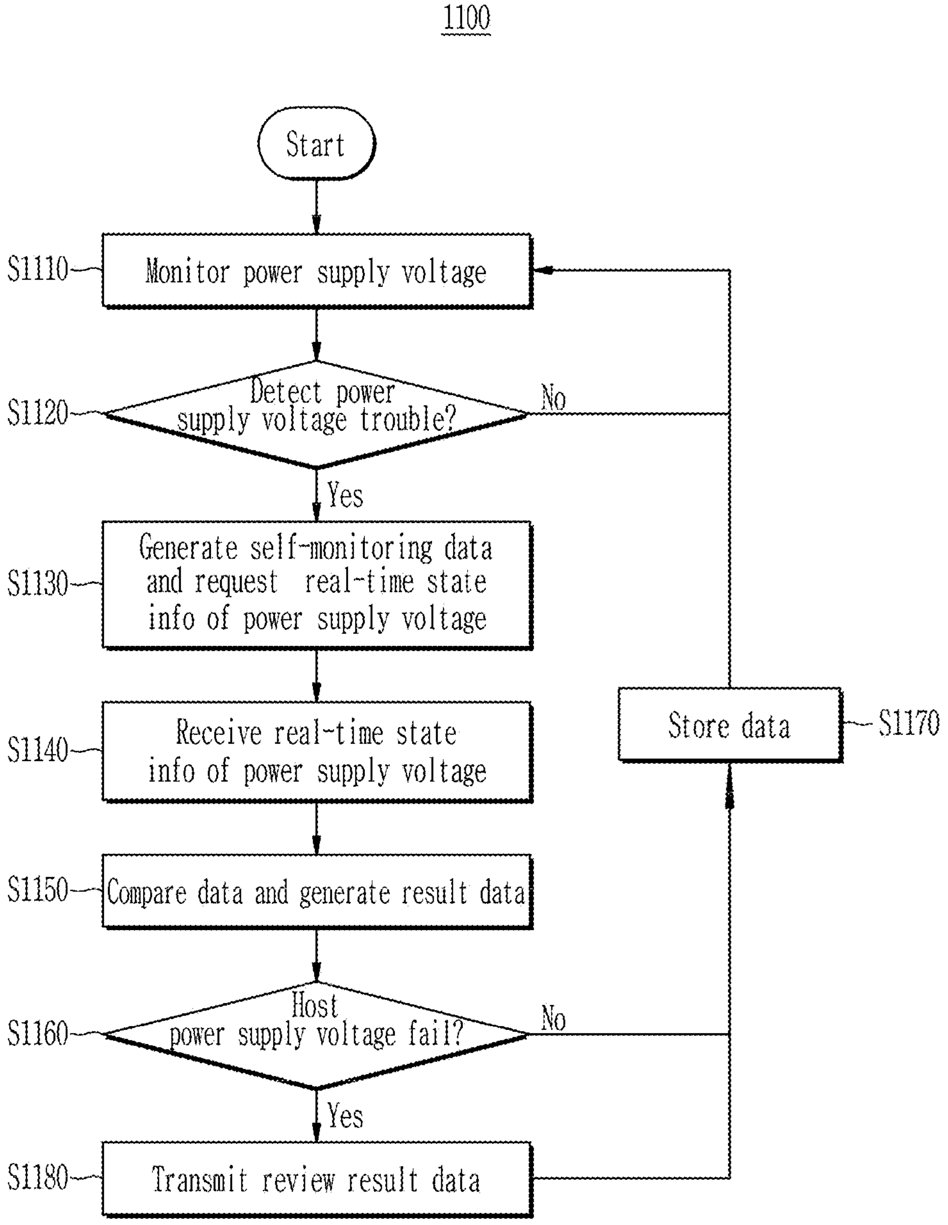
FIG. 11 shows a flowchart on a method for operating a storage device according to some example embodiments.

FIG. 11 shows a flowchart on a method for operating a storage device according to some example embodiments. Regarding the operation method 1100 of FIG. 11, the identical or similar operation to the operation method described with reference to FIG. 8 and FIG. 9 will not be described.

In some example embodiments, the OMC in the storage device may monitor the power supply voltage supplied to the storage device (S1110). The OMC may monitor the power supply voltage periodically or in comparison with a threshold value by use of a comparator.

In some example embodiments, the OMC may detect a power supply voltage trouble supplied to the storage device (S1120). The power supply voltage trouble may include a voltage drop, a voltage spike, or noise, such as a glitch or the like.

In some example embodiments, the OMC may generate self-monitoring data on the power supply voltage, and may request real-time state information of the power supply voltage from the host device (S1130). The self-monitoring data may include times when the power supply voltage trouble is detected, identification information of the storage device, voltages, and current values.

In some example embodiments, the OMC may receive real-time state information of the power supply voltage (S1140). The real-time power supply voltage data may include setting values of the power supply voltage provided to the storage devices connected to the host device.

In some example embodiments, the OMC may compare the real-time power supply voltage data and the self-monitoring data and may generate result data (S1150). In this instance, the OMC may further generate real-time self-monitoring data.

In some example embodiments, the OMC may determine whether the power supply voltage error caused by the storage device is generated by the power supply voltage provided by the host device (S1160). For example, the OMC may determine whether the power supply voltage output by the host device has a trouble, the power rail connected to the storage device has a trouble, or it is caused or influenced by the adjacent storage device.

In some example embodiments, when determining that the power supply voltage error caused to the storage device is caused or influenced by the power supply voltage provided by the host device, the OMC may transmit corresponding result data to the host device (S1180), and may store self-monitoring data, real-time power supply voltage data, and result data (S1170).

In some example embodiments, when determining that the power supply voltage error caused to the storage device is caused or influenced by the power supply voltage provided by the host device, the OMC may store the self-monitoring data, the real-time power supply voltage data, and the result data (S1170).

Figure 12:
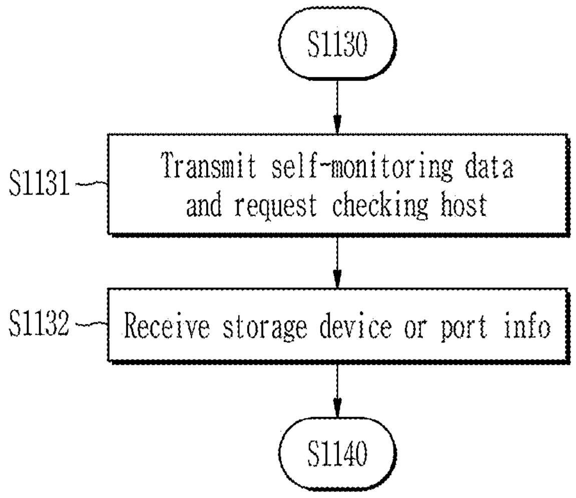
FIG. 12 shows an operation of a storage device according to some example embodiments.

FIG. 12 shows an operation of a storage device according to some example embodiments.

In some example embodiments, the OMC may transmit the self-monitoring data and may request checking of a host power supply voltage by the host device (S1131) in addition to/as an option to the requesting (S1130) of real-time power supply voltage data from the host device. For example, when the peak of the power supply voltage (PWR) has a value that is equal to or greater than the threshold value (Vb) or is equal to or less than the threshold value (Va), the OMC may determine that an error is generated to the power supply voltage (PWR), and may request transmission of the self-monitoring data and checking of the host power supply voltage. Data transmission and request to the host device by the OMC may be performed through the SMBus.

In some example embodiments, the OMC may receive storage device or power port information that is recently unrecognizable from the host device with respect to the time of receiving self-monitoring data (S1132). For example, when receiving the recently unrecognizable storage device or power port information from the host device, it may be found that the cause of the error of the power supply voltage (PWR) generated in the storage device is caused or influenced from the corresponding storage device or the power port.

In some example embodiments, the OMC may store the self-monitoring data and the data received from the host device in a non-volatile memory of the storage device. In some example embodiments, the host device and/or the storage device may correct an operational voltage, disable a faulty connection, or take another appropriate action, etc. based on the determined cause of power supply voltage trouble.

Figure 13:
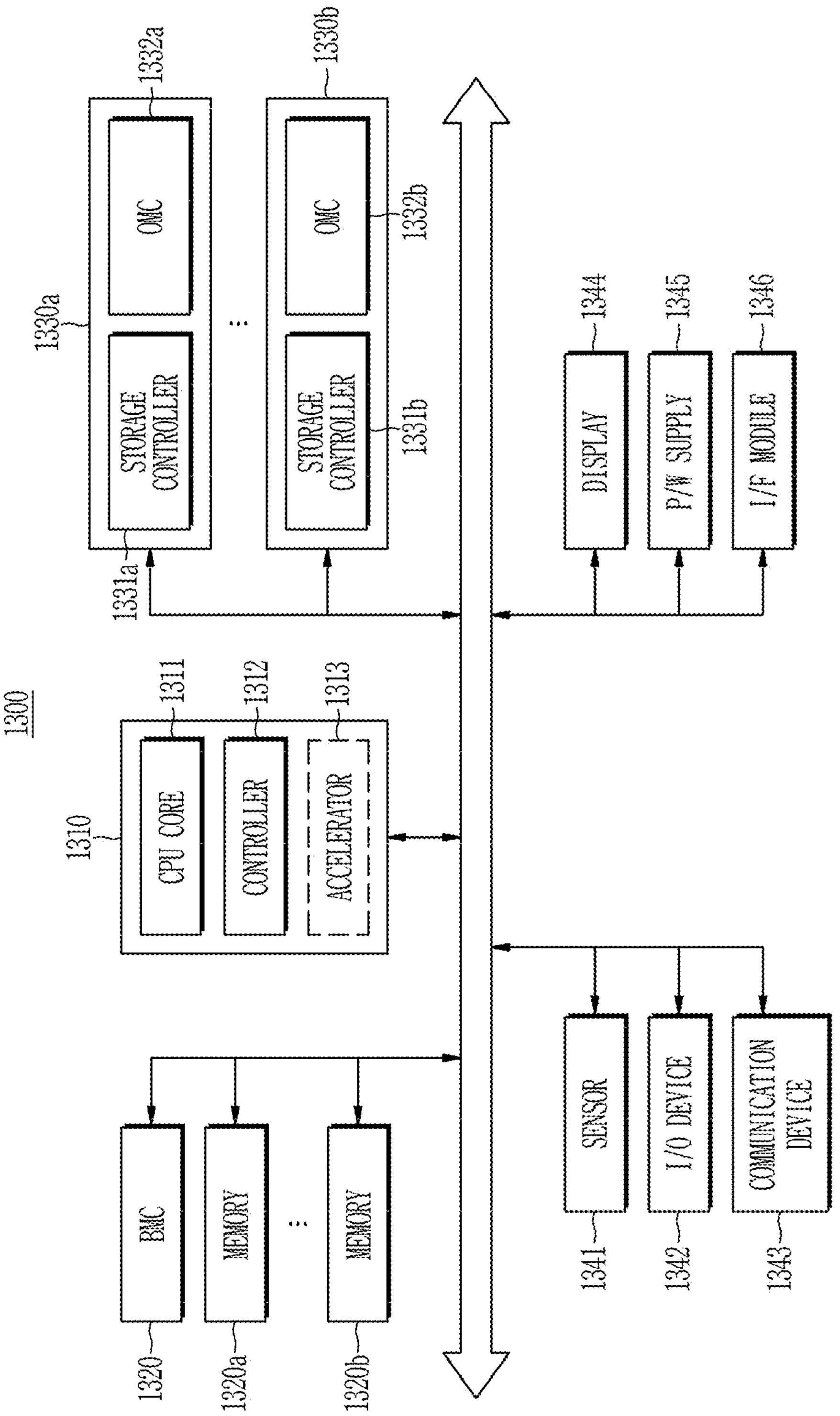
FIG. 13 shows a system to which a storage device according to embodiment of the present disclosure is applied.

FIG. 13 shows a system to which a storage device according to embodiment of the present disclosure is applied.

The system 1300 may include a main processor 1310, a BMC 1320, memories 1320*a* and 1320*b*, and storage devices 1330*a* and 1330*b*, and may further include a sensor 1341, an input/output (I/O) device 1342, a communication device 1343, a display 1344, a power (P/W) supply 1345, and an interface (I/F) module 1346.

The main processor 1310 may control a general operation of the system 1000, in detail, the operations of other components configuring the system 1300. The main processor 1310 may be realized with a general-purpose processor, an exclusive-use processor, or an application processor.

The main processor 1310 may include at least one CPU core 1311, and may further include a controller 1312 for controlling the memories 1320*a* and 1320*b* and/or the storage devices 1330*a* and 1330*b*. Depending on embodiments, the main processor 1310 may further include an accelerator 1313 that is an exclusive circuit for a high-rate data operation such as an artificial intelligence (AI) data operation. The accelerator 1313 may include a graphics processing unit (GPU), a neural processing unit (NPU) and/or a data processing unit (DPU), and may be realized with an individual chip that is physically independent from the other components of the main processor 1310.

The BMC 1320 may collect FRU data from an FRU such as a sensor 1341 or a power supply 1345. The BMC 1320 may communicate with the main processor 1310 through a first-type bus, and may communicate with the storage devices 1330*a* and 1330*b* through a second-type bus. The BMC 1320 may receive a signal for requesting real-time state information of the system 1300 from the storage devices 1330*a* and 1330*b* through the second-type bus. The BMC 1320 may transmit real-time state information of the system 1300 through the second-type bus based on the request of the storage devices 1330*a* and 1330*b*.

The memories 1320*a* and 1320*b* may be used as a main memory device of the system 1300, and may include a volatile memory such as an SRAM and/or a DRAM, and may include a non-volatile memory such as a flash memory, a PRAM, and/or an RRAM. The memories 1320*a* and 1320*b* may be realized in a same package as the main processor 1310.

The storage devices 1330*a* and 1330*b* may include OMCs 1332*a* and 1332*b* for monitoring states of the storage controllers 1331*a* and 1331*b* and the storage devices 1330*a* and 1330*b*. The OMCs 1332*a* and 1332*b* may monitor real-time states of the storage devices 1330*a* and 1330*b*, and when detecting a trouble, may transmit a signal for requesting state information thereof to the BMC 1320 through the second-type bus. The OMCs 1332*a* and 1332*b* may store the state information of the monitored storage devices 1330*a* and 1330*b* and the state information received from the BMC 1320 in the memory in the storage controllers 1331*a* and 1331*b*.

The storage devices 1330*a* and 1330*b* may be physically separated from the main processor 1310 and may be installed in the system 1300, or may be realized in the same package as the main processor 1310. Further, the storage devices 1330*a* and 1330*b* may have a form that is like the SSD or the memory card, and may be combined to other components of the system 1300 in an attachable/detachable way through an interface such as the interface module 1346. The storage devices 1330*a* and 1330*b* may be a device to which a standard rule is applied, such as a universal flash storage (UFS), an embedded multi-media card (eMMC), or a non-volatile memory express (NVMe), which is not limited thereto.

In some example embodiments, the storage devices 1330*a* and 1330*b* may be the storage devices described with reference to FIG. 1 to FIG. 12. The storage devices 1330*a* and 1330*b* may be operable based on the operation method described with reference to FIG. 1 to FIG. 12.

The sensor 1341 may detect various types of physical quantities obtainable from the outside of the system 1300, and may transform the detected physical quantities into electrical signals. The sensor 1341 may be a temperature sensor, a pressure sensor, an illumination sensor, a position sensor, an acceleration sensor, a biosensor, and/or a gyroscope sensor.

The user input device 1342 may receive various types of data input by a user of the system 1300, and may be a touch pad, a keyboard, a keyboard, a mouse, and/or a microphone.

The communication device 1343 may transmit/receive signals between other devices outside the system 1300 according to various communication rules. The communication device 1540 may be realized including an antenna, a transceiver, and/or a modem.

The display 1344 may function as an output device for outputting visual information to the user of the system 1300.

The power supply device 1345 may appropriately transform power supplied by a battery (not shown) installed in the system 1300 and/or an external power source and may supply the same to the components of the system 1300.

The interface module 1346 may provide a connection between the system 1300 and an external device connected to the system 1300 and transmitting/receiving data to/from the system 1300. The interface module 1346 may be realized with various interface methods such as the advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, universal serial bus (USB), secure digital (SD) card, multimedia card (MMC), eMMC, UFS, embedded universal flash storage (eUFS), compact flash (CF) card interface, or NVMe management interface (NVMe-MI).

When the terms "about" or "substantially" are used in this specification in connection with a numerical value, it is intended that the associated numerical value includes a manufacturing or operational tolerance (for example, ±10%) around the stated numerical value. Further, regardless of whether numerical values are modified as "about" or "substantially," it will be understood that these values and shapes should be construed as including a manufacturing or operational tolerance (for example, ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While this disclosure has been described in connection with what is presently considered to be practical example embodiments, it is to be understood that the disclosure is not limited to the disclosed example embodiments, but, on the contrary, is intended to cover various modifications and equivalent arrangements included within the spirit and scope of the appended claims.

What is claimed is:

1. A method for operating a storage device comprising:

monitoring a power supply voltage provided by an external host device;

detecting an error of the power supply voltage during an operating period of the storage device;

generating self-monitoring data of the power supply voltage during the operating period of the storage device, and requesting real-time state information from the external host device, based on detection of the error of the power supply voltage during the operating period of the storage device;

receiving the real-time state information from the external host device;

generating result data for-indicating whether the error of the power supply voltage is caused by the storage device based on the self-monitoring data and the real-time state information; and transmitting the result data to the external host device.

2. The method of claim 1, wherein the generating of the result data includes generating real-time self-monitoring data, and comparing the self-monitoring data, the real-time state information, and the real-time self-monitoring data.

3. The method of claim 1, wherein the detecting of the error of the power supply voltage is based on a first peak value of the power supply voltage being equal to or greater than a first value or a second peak value of the power supply voltage being equal to or less than a second value.

4. The method of claim 3, wherein the requesting of the real-time state information from the external host device includes transmitting the self-monitoring data to the external host device;

requesting a state checking from the external host device; and receiving information about a first storage device from among storage devices connected to the external host device from the external host device.

5. The method of claim 4, wherein the first storage device includes a storage device that becomes unrecognizable to the external host device within a monitoring time after transmitting the self-monitoring data.

6. The method of claim 1, further comprising storing the self-monitoring data and the real-time state information in an internal non-volatile memory.

7. The method of claim 1, wherein the self-monitoring data includes time information for indicating a time when the error of the power supply voltage is detected, identification information of the storage device, and a value of the power supply voltage received by the storage device.

8. The method of claim 1, wherein the detecting of the error of the power supply voltage includes detecting the error based on the power supply voltage being equal to or less than a threshold value.

9. The method of claim 1, wherein the real-time state information includes a value of the power supply voltage provided by the external host device in response to requesting the real-time state information from the external host device.

10. A storage system comprising:

a host device including a power managing module configured to provide a power supply voltage and a baseboard management controller (BMC) configured to collect state information about the power managing module; and a storage device including a storage controller configured to perform a data processing operation based on a command from the host device, an out-of-band management controller (OMC) configured to detect an error of the power supply voltages provided by the storage controller and the power managing module through a first-type bus while performing the data processing operation based on the command from the host device and during an operating period of the storage device, generate self-monitoring data indicating state information on the power supply voltage, during the operating period of the storage device, based on detection of the error of the power supply voltage, request, from the BMC during the operating period of the storage device, real-time state information on the power supply voltage provided by the power managing module, the request transmitted through a second-type bus that is different from the first-type bus, and compare the self-monitoring data and the real-time state information and generate result data for-indicating whether the error of the power supply voltage is caused by the host device in response to receiving the real-time state information from the BMC through the second-type bus.

11. The storage system of claim 10, wherein the first-type bus is a peripheral component interconnect express (PCIe) bus, and the second-type bus is a system management bus (SMBus) or an inter-integrated circuit (I2C) bus.

12. The storage system of claim 10, wherein the storage device further includes a non-volatile memory configured to store the self-monitoring data and the real-time state information.

13. The storage system of claim 10, wherein the OMC includes a comparator configured to compare the power supply voltage provided by the power managing module and a value.

14. The storage system of claim 13, wherein the OMC is configured to transmit a signal, to the BMC through the second-type bus, requesting a state check on storage devices connected to the host device based on a first peak value of the power supply voltage being equal to or greater than a first value or a second peak value of the power supply voltage being equal to or less than a second value that is different from the first value.

15. The storage system of claim 14, wherein the BMC is configured to transmit data including information on at least one storage device performing a hot-plug operation to the OMC after receiving the signal for requesting the state checking from among the storage devices.

16. The storage system of claim 10, wherein the real-time state information includes the state information of the power managing module collected by the BMC in response to receiving the request for the real-time state information from the OMC.

17. The storage system of claim 10, wherein the self-monitoring data includes time information indicating a time at which the error of the power supply voltage has been detected, identification information of the storage device, and a value of the power supply voltage received from the power managing module.

18. A storage device comprising:

a storage controller configured to perform a data processing operation with an external host device through a first-type bus; and an OMC configured to monitor a power supply voltage received from the external host device, generate first log data indicating state information on the power supply voltage received from the external host device based on detecting an error of the power supply voltage during an operating period of the storage device, request, based on the OMC being operated as a master device, second log data indicating real-time state information on the power supply voltage during the operating period of the storage device from the external host device through a second-type bus that is different from the first-type bus, determine a cause of the error of the power supply voltage based on comparing the first log data and the second log data, and transmit result data to the external host device in response to the error of the power supply voltage being caused by the external host device, the result data generated by comparing the first log data and the second log data.

19. The storage device of claim 18, wherein the OMC is configured to repeatedly request the second log data for a request period based on the external host device being operated as the master device based on the OMC requesting the second log data more than once within a period.

20. The storage device of claim 18, wherein the first-type bus is a peripheral component interconnect express (PCIe) bus, and the second-type bus is a system management bus (SMBus) or an inter-integrated circuit (I2C) bus.

* * * * *